United States Patent Office 2,768,185
Patented Oct. 23, 1956

2,768,185

PROCESS FOR PRODUCING $\Delta^{9,11}$-7-KETO-STEROIDS

Leopold Ruzicka, Hans Heusser, and Oskar Jeger, Zurich, Switzerland, assignors to Ciba Pharmaceutical Products, Inc., Summit, N. J.

No Drawing. Application December 13, 1951,
Serial No. 261,589

Claims priority, application Switzerland
December 22, 1950

3 Claims. (Cl. 260—397.1)

The present invention is concerned with a new process leading to new compounds which make it possible to synthesize therapeutically active steroids containing oxygen in the 11-position.

The steroids with oxygen in 11-position are of great importance. An important representative of this class of compounds is for example cortisone, $\Delta^4$-3,11,20-trioxo-17$\alpha$,21-dihydroxy-pregnene. The hitherto known processes for the synthetic production of such steroids used as starting materials desoxycholic acid and its derivatives, that is to say compounds which possess a hydroxyl group in 12-position. It has been show however that the transfer of oxygen from the 12- to the 11-position is a very tedious process requiring several operations. In addition the desoxycholic acid used as starting material is only obtainable in relatively limited quantity, so that for example it is practically impossible to manufacture the cortisone required in therapy in sufficient quantity by this method. A requirement therefore exists for new sources for the manufacture of this medicament. The easily available sterols, such as ergosterol, stigmasterol or sitosterol, but more especially cholesterol, have indeed for many years been important starting materials for the production of sex hormones. They have however hitherto been without importance for the production of compounds with oxygen in the 11-position of the intact steroid structure.

The present invention is based on the observation that by starting from the above-mentioned sterols or conversion products thereof, compounds of the steroid series with oxygen in the 11-position can be obtained when a $\Delta^{7,8;9,11}$-steroid is treated in stages with an agent capable of introducing oxygen, the resultant 9,11-oxido compound is isomerized, and the oxo-group in 7-position of the resultant 7,11-dioxo-steroid is removed by reduction.

The process is illustrated by the following diagram of partial formulae:

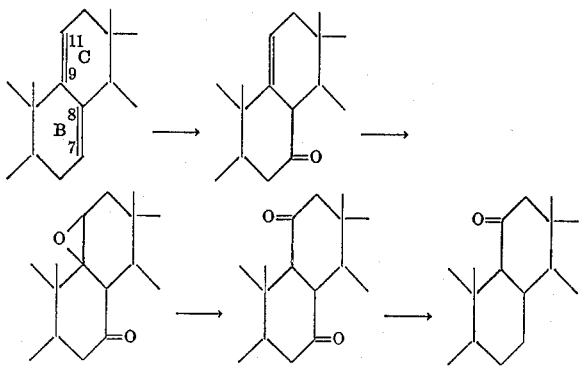

An object of the present invention are $\Delta^{9,11}$-7-oxo-steroids. These compounds are new and are intended for use as intermediate products for the preparation of 11-oxo-steroids and 11-hydroxy-steroids. Thus, e. g., the present invention is a step in the preparation of the methyl-3$\alpha$-acetoxy-11-oxo-cholanate (see e. g. Example 5 of copending application S. N. 261,581, filed on even date herewith) which is a recognized and well known intermediate for the production of the highly active hormone 11-dehydro-corticosterone (cf. Wettstein & Meystre: Helv. Chim. Acta, vol. 30, pp. 1262–1265 (1947)). Another object of the invention is a process for the manufacture of $\Delta^{9,11}$-7-oxo-steroids. It comprises the reaction of chromic acid with $\Delta^{7,8;9,11}$-steroids.

These steroids belong to the cyclopentanopolyhydrophenanthrene or the polyhydrochrysene series. Particular importance is attached to the derivatives of cholestane, coprostane, sitostane, stigmastane, cholane, allocholane, pregnane, androstane and etiocholane. In addition to the aforementioned double bonds, the starting materials may have other double-bonds. Where any double-bonds are reactive these are suitably protected before the oxidation step of the process, for example by attachment of halogen or hydrogen halide. For the protection of the 5,6-double bond, $\Delta^{5,6}$-steroids may be converted into i-steroids. They can be obtained, e. g. from the corresponding $\Delta^{7,8}$-compounds by dehydrogenation with mercuric acetate, selenium dioxide or bromine.

For the oxidation according to the invention, chromic acid is used in the presence of a diluent, such as an organic solvent, such as benzene or glacial acetic acid.

The following examples illustrate the invention, the relation between parts by weight and parts by volume being the same as that between the gram and the cubic centimeter:

Example 1

6 parts by weight of $\Delta^{7,8;9,11;22,23}$-3$\beta$-acetoxy-ergostatriene are dissolved in 500 parts by volume of glacial acetic acid and 3 parts by weight of chromic acid, dissolved in 100 parts by volume of 90 per cent acetic acid, are slowly dropped in while stirring. Stirring is continued for one hour at the end of which time all the oxidizing agent is consumed. The reaction mixture is diluted with water, extracted with ether and the ethereal solution worked up in the usual way. From the crude product there is obtained by crystallization from methanol $\Delta^{9,11;22,23}$-3$\beta$-acetoxy-7-oxo-ergostadiene in nice crystals of melting point 176–178° C. $[\alpha]_D = -58°$ (in chloroform). This substance has no characteristic absorption band in the ultraviolet spectrum.

If $\Delta^{7,8;9,11;22,23}$-3-$\beta$-acetoxy-stigmastatriene is treated with chromic acid under the same conditions $\Delta^{9,11;22,23}$-3$\beta$-acetoxy-7-oxo-stigmastadiene is obtained.

Example 2

1 part by weight of $\Delta^{7,8;9,11}$-3$\beta$,20-diacetoxy-allo-pregnadiene is dissolved in 80 parts by volume of glacial acetic acid and transferred into a three-necked flask equipped with a thermometer, a dropping funnel and an efficient stirrer. A solution of 0.5 part by weight of chromic acid in 15 parts by volume of 90 per cent acetic acid is then slowly dropped into the well stirred solution, which is kept at +17° C. by cooling in a water bath. After the addition is complete, stirring is continued for one hour, during which time all the oxidizing agent is consumed. The reaction mixture is then worked up by diluting with ether, washing the ethereal solution with water, sodium bicarbonate solution and water, drying and evaporating. From the crude reaction product $\Delta^{9,11}$-3$\beta$,20-diacetoxy-7-oxo-allo-pregnene can be isolated by crystallization from a mixture of acetone and water or ether and hexane. In the ultraviolet spectrum this product only shows end absorption at low wave length.

By oxidizing $\Delta^{7,8;9,11}$-3$\beta$,17$\beta$-diacetoxy-androstadiene in an analogous manner $\Delta^{9,11}$-3$\beta$,17$\beta$-diacetoxy-7-oxo-androstene is obtained. In an analogous way $\Delta^{7,8:9,11}$-3$\beta$-acetoxy-cholestadiene can be converted into $\Delta^{9,11}$-3$\beta$-acetoxy-7-oxo-cholestene.

*Example 3*

0.6 part by weight of methyl $\Delta^{7,8:9,11}$-3$\alpha$-acetoxy-choladienate is dissolved in 10 parts by volume of benzene. 50 parts by volume of acetic acid are added and 0.3 part by weight of chromic acid dissolved in 10 parts by volume of 90 per cent acetic acid are slowly dropped into the well stirred benzene-acetic acid solution at room temperature. The reaction mixture is stirred for a period of 2 hours and then worked up exactly as described in Example 2. There is obtained a slightly yellow residue, from which methyl $\Delta^{9,11}$-3$\alpha$-acetoxy-7-oxo-cholenate is obtained by crystallization from a mixture of acetone and hexane or ether and hexane.

What is claimed is:

1. A process for the conversion of a member selected from the group consisting of $\Delta^{7,8:9,11}$-3-lower alkylcarbonyloxy-ergostadienes, $\Delta^{7,8:9,11}$-3-lower alkylcarbonyloxy-stigmastadienes, $\Delta^{7,8:9,11}$-3-lower alkylcarbonyloxy-allo-pregnadienes, $\Delta^{7,8:9,11}$-3-lower alkylcarbonyloxy-androstadienes, $\Delta^{7,8:9,11}$-lower alkylcarbonyloxy-cholestadienes and $\Delta^{7,8:9,11}$-3-lower alkylcarbonyloxy-choladienes to the corresponding $\Delta^{9,11}$-3-lower alkylcarbonyloxy-7-oxo-compounds, which comprises subjecting the said member of the said group to the action of chromic acid.

2. A process for the conversion of a lower alkyl $\Delta^{7,8:9,11}$-3-lower alkylcarbonyloxy-choladienate to the corresponding lower alkyl $\Delta^{9,11}$-3-lower alkylcarbonyloxy-7-oxo-cholenate, which comprises subjecting the lower alkyl $\Delta^{7,8:9,11}$-3-lower alkylcarbonyloxy-choladienate to the action of chromic acid.

3. A process for the conversion of methyl $\Delta^{7,8:9,11}$-3$\alpha$-acetoxy-choladienate to the corresponding methyl $\Delta^{9,11}$-3$\alpha$-acetoxy-7-oxo-cholenate, which comprises subjecting the methyl $\Delta^{8,8:9,11}$-3$\alpha$-acetoxy-choladienate to the action of chromic acid.

References Cited in the file of this patent

Fieser et al.: Natural Products Related to Phenanthrene, 3rd ed., p. 425 (1949), and pp. 282–85.